June 7, 1938.  R. A. WITTMANN  2,119,977
HYGROMETER
Filed July 1, 1936  3 Sheets-Sheet 1
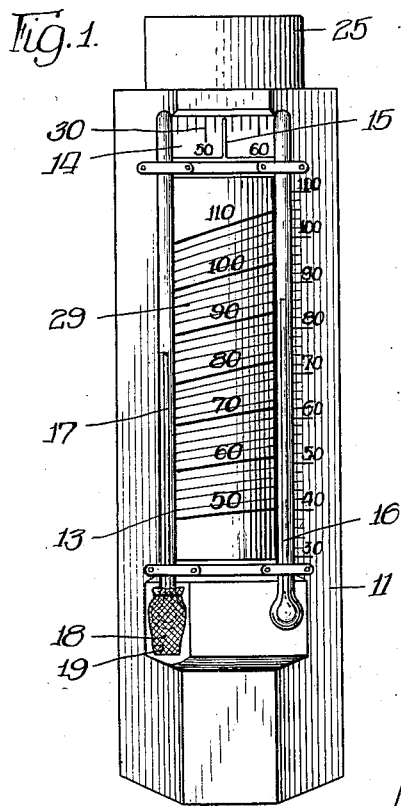
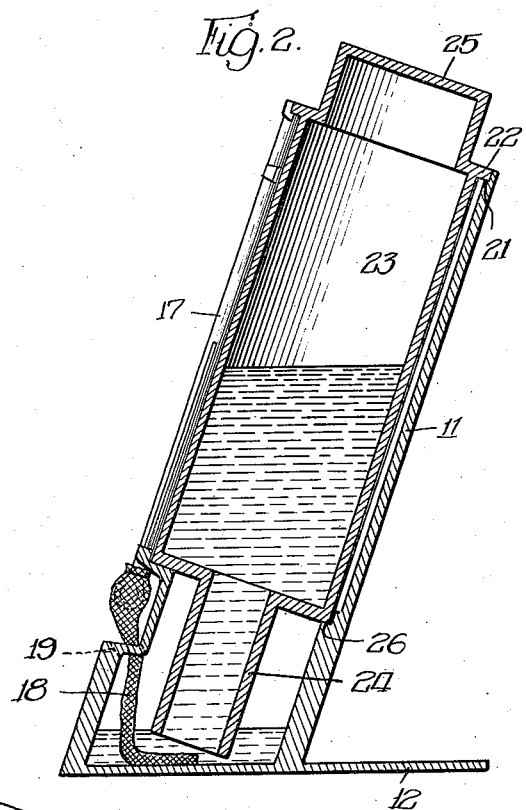
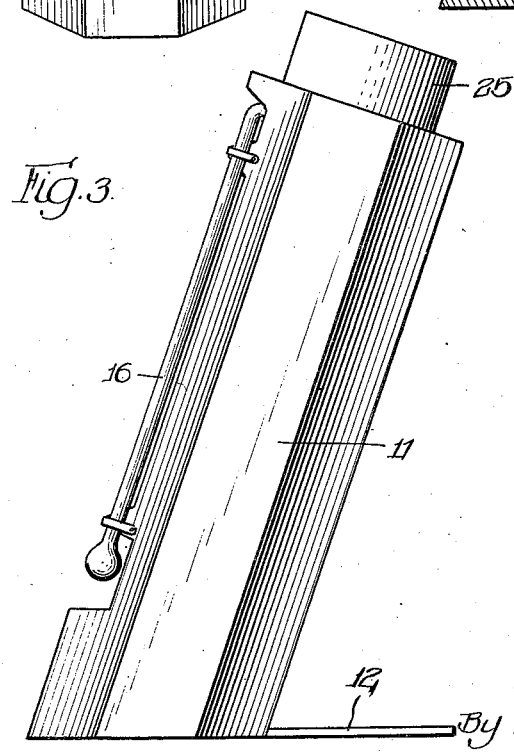
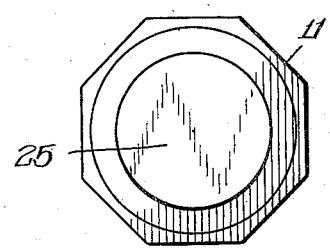
Inventor:
Robert A. Wittmann,
By Walter M. Fuller
atty.

Inventor:
Robert A. Wittmann,
By Walter M. Fuller atty.

June 7, 1938.  R. A. WITTMANN  2,119,977
HYGROMETER
Filed July 1, 1936   3 Sheets-Sheet 3
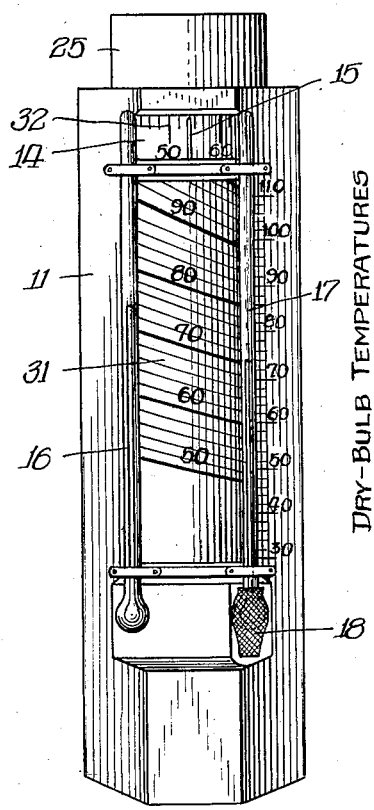
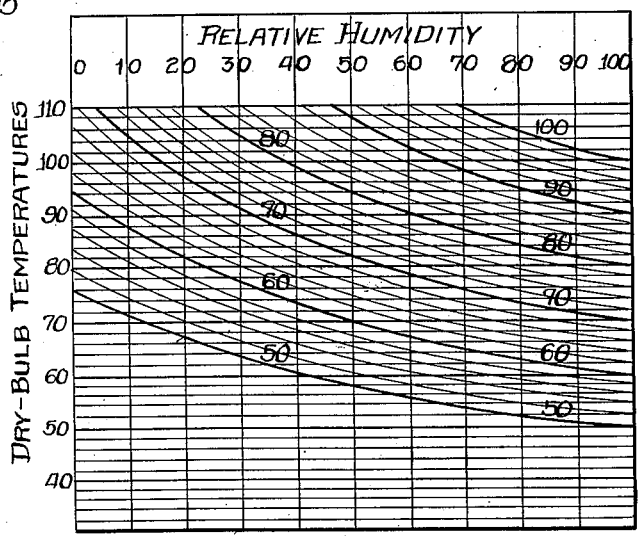
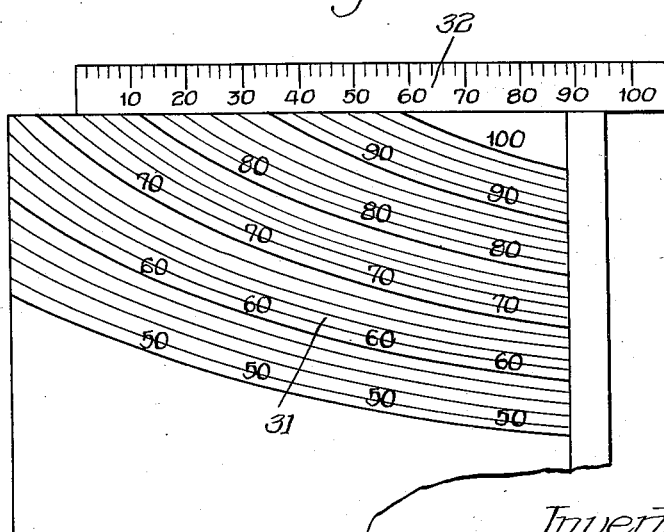
Inventor:
Robert A. Wittmann,
By Walter M. Fuller
Atty.

Patented June 7, 1938

2,119,977

UNITED STATES PATENT OFFICE 2,119,977

HYGROMETER

Robert A. Wittmann, Chicago, Ill., assignor of one-half to Robert G. Guthrie, Chicago, Ill.

Application July 1, 1936, Serial No. 88,315

7 Claims. (Cl. 73—338)

The present invention relates to a type or style of indicating hygrometer which can be satisfactorily used by unskilled persons, regardless of their knowledge of the thermal properties of mixtures of air and water-vapors, who wish to know the relative-humidity of air, either from a comfort standpoint or for the purpose of adjusting or regulating equipment to afford a predetermined desired condition.

Hygrometers have heretofore been made of various designs involving different principles of operation, one common method being the employment of wet-bulb and dry-bulb thermometers, the difference in the readings of which discloses what is known as the wet-bulb depression.

Knowing the dry-bulb temperature and the wet-bulb depression, the individual then makes reference to a chart of a sliding scale or disc arrangement from which the relative humidity is read.

This procedure, or the method embraced, is not easily understood by the average non-technical person, it is subject to confusion, and the transporting of the figures and the mathematics included provide a ready source of error and delay.

Another common way of indicating the relative humidity is with an instrument having a membrane affected by the water-vapor in the air, such membrane moving an index over a scale, these appliances having proved to be unreliable, irregular, and comparatively short-lived.

Accordingly, one of the main and leading objects of the present invention is to provide a hygrometer which is net, compact, of attractive appearance and of either the standing or wall type; which is relatively inexpensive to produce; whose principles of operation are so extremely simple that the average layman can readily comprehend them; which eliminates the necessity for mathematical deductions or reference to any psychrometric chart, or especially designed disc, sliding scale, etc., for ascertainment of the relative humidity of the air; which will accurately designate such relative humidity without the necessity for vigorously fanning the wick of the wet-bulb thermometer; with which it is only necessary to read either the dry-bulb or the wet-bulb thermometer temperature, depending upon the style of instrument employed, to adjust the appliance; and which has an individual window through which the relative humidity may be read, after adjustment, without possibility of confusion or doubt as to the correct reading; further features of betterment and advantage being apparent from the following detailed description.

To permit those acquainted with this art to understand this novel invention fully, both from structural and functional standpoints, present preferred embodiments of the same have been illustrated in the accompanying drawings which should be considered in connection with the following detailed description, and for simplicity like reference numerals have been employed to designate the same parts throughout the several views of these drawings.

In these drawings:—

Figure 1 is a face view or front elevation of one embodiment of the invention with the instrument in upright position;

Figure 2 is a central, vertical section through the appliance, showing it in its ordinary inclined relation;

Figure 3 is a side view of the hygrometer;

Figure 4 is a top plan view of the same;

Figure 7 is a face view of a modified style of hygrometer;

Figure 8 illustrates in flat form the temperature-chart forming a part of the appliance of Figure 7; and Figure 9 shows the manner in which the chart of Figure 8 is derived.

Figure 5:
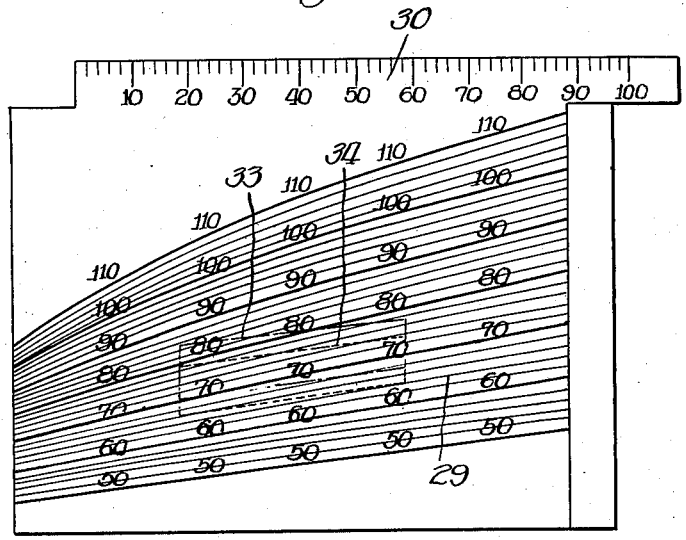
Figure 5 is a face view of the rotary chart, laid out flat, forming a part of the hygrometer shown in Figures 1 to 3, inclusive.

Referring first to the hygrometer portrayed in Figures 1 to 4, inclusive, it will be noted that the novel instrument comprises a somewhat rearwardly-inclined outside shell or casing 11 having a suitable base 12 not only underlying the lower end of member 11 but also projecting backwardly therefrom to afford an adequate support for the hygrometer without danger of its being tipped over, the degree of tilt of the device being conveniently about 25° from the vertical.

In its front, such casing has a central, elongated, longitudinal window 13 and above that a smaller window 14 equipped at its middle with an upright wire or index 15.

On the right-hand side of the front of the appliance and directly adjacent to and parallel to the window 13, a graduated dry-bulb thermometer 16 is mounted in any approved manner, and, in a similar position at the opposite side of the same window, an ungraduated, wet-bulb thermometer 17 is fixed, the wick 18 of which extends inwardly through an opening 19 in the front wall of the casing into the lower portion of its interior, which comprises a water-reservoir, as shown more fully in Figure 2.

These two parallel thermometers are alike except for their graduated and ungraduated features and their dry and wet properties and they are arranged in register with one another transversely, in fact, if the wet-bulb should become dry the tops of the liquids in the two thermometers would stand at the same level.

The inside of the outer casing 11 is hollowed out cylindrically for the purpose of receiving a hollow cylinder 23 which at its top has an operating-knob 25, and at its upper open end this shell or casing 11 has an internal, annular shoulder or ledge 21 on which a circular flange or rib 22 on the upper portion of the cylinder is adapted to bear and to turn, the cylinder 23 at its lower end being fitted with a reduced-diameter lower stem 24 open at its bottom end and communicating at its upper end with the interior of the cylinder, all as is clearly illustrated.

Knob 25 which extends upwardly beyond the top of the casing constitutes a convenient handle by means of which the cylinder may be turned for the purpose hereinafter indicated.

One function of flange 22 and ledge 21 is to mount the cylinder in a predetermined position in the casing and to provide clearance between it and the inside of the casing for the accommodation of a chart hereinafter referred to specifically wrapped around and fixed to the outer surface of the cylinder, so that the chart will not rub on the casing when the cylinder is turned.

The lower end of the specified cylinder bears on and is rotatable on a seat 26 on the inside of the casing which spaces the outer surface of the cylinder inwardly away from the inner surface of the casing to afford at this point the above-indicated protection for the chart mentioned.

It will be observed that the open lower end of the stem 24 is somewhat above the casing-floor, and, when the instrument is in operation, the interior of the cylinder constitutes a water-supply reservoir, the liquid therein maintaining the water-level in the casing at the point indicated, that is, at the bottom of the stem.

As the water of the wick gradually evaporates and draws more from the casing, the water in the casing-well is automatically replenished from the inverted cylinder in the manner long in use in connection with poultry drinking-fountains, the pressure of the external atmosphere preventing discharge of the water from the cylinder except to keep the indicated level in the casing, whereby to avoid unnecessary evaporation and too frequent refilling.

To recharge the instrument with water, the cylinder is lifted out, inverted, and filled with water through its stem, whereupon the casing, in inverted position, is slid down over it, and then the two as a unit are reversed and the device is again ready for action, the water inside of the cylinder constituting a supply which is gradually drawn upon by the evaporation of the water from the wet-bulb wick.

Such water renewal in the cylinder is ordinarily required only after several days or a month or more.

The exterior of such cylinder is covered with, and has cemented thereon, a combined temperature-chart 29 and associated relative-humidities scale 30, a portion of the former always being visible through the window 13 and the corresponding part of the latter through the companion window 14.

Figure 6:
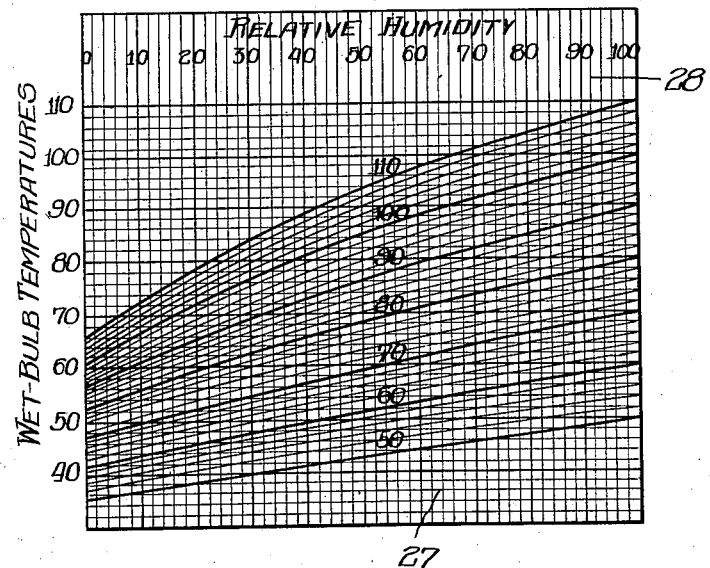
Figure 6 is a similar view of a chart illustrating how the chart of Figure 5 is made.

Such combined chart and scale is made in the manner set forth in Figure 6 wherein, in a rectilinear system of co-ordinates, the horizontal, equally-spaced lines 27 represent the wet-bulb thermometer temperatures which would correspond or conform to the temperature graduations of the thermometer were the latter graduated, and the vertical, equi-spaced lines 28 represent the relative-humidities which are shown by the numerals associated with such lines.

On this chart the oblique lines represent dry-bulb thermometer temperatures and they extend or curve upwardly to the right and end at a point corresponding to 100% relative humidity or saturated-air conditions.

The indicated relationship of the dry-bulb temperature curved lines to the wet-bulb temperatures and degrees of relative humidity is in accordance with the psychrometric properties of air at its dry-bulb temperature and with a varying amount of water-vapor from 100% saturated air at 100% relative humidity to dry air at 0% relative humidity.

To obtain accurately the correct wet-bulb reading from the ordinary psychrometric chart, the air should move over the wet-bulb thermometer wick at a velocity in the neighborhood of six hundred feet per minute, and this is difficult to obtain without an expensive and annoying mechanical apparatus.

In order that this new hygrometer may give the correct readings of the relative hygrometric states of the atmosphere with the wet-bulb wick in comparatively still air, that is ordinary room air which has an average velocity of about twenty-five feet per minute, this new chart has been designed from test data giving the relationship between the dry-bulb temperature, the wet-bulb temperature, and the relative humidity in such still air.

Inasmuch as the indicated horizontal and vertical lines are not necessary during use of the instrument, and since the index or wire 15 at window 14 is laterally offset from the bore of the wet-bulb thermometer 17, the chart 29 and scale 30, as actually used in the device, are presented in Figure 5, where such lines are omitted and the relative humidity scale is displaced sidewise with relation to the chart an amount corresponding to such distance to compensate for the non-alignment or non-register of the wet-bulb thermometer with the index 15.

In the illustration of Figure 5, the chart, because different from that of Figure 6, has been designated by the reference numeral 29 and the offset scale by the numeral 30.

The simplicity and ease of operation of the novel hygrometer and the avoidance of error will be readily understood from the following.

The operator reads the temperature of the dry-bulb thermometer, as indicated by the height of its liquid column with relation to its adjacent graduations, then he turns the cylinder and its chart and scale as viewed through window 13 until the inclined line representing such dry-bulb temperature registers with the top of the liquid in the bore of the wet-bulb thermometer, and then he reads the relative humidity of scale 30 as indicated by its index 15.

Obviously, this procedure is extremely simple and there is no occasion for, or likelihood of, making any mistake.

Inasmuch as the dry-bulb thermometer has no direct mechanical relationship to the chart, it need not be a part of the instrument, but may be wholly separate, and even located at some distance, therefrom.

All that it does is to indicate the dry-bulb thermometer temperature, but, on the other hand, there is of course a direct mechanical co-operation between the wet-bulb thermometer and the chart and between the latter and the relative-humidity scale.

Manifestly, if preferred, the chart and scale could be maintained stationary and the wet-bulb thermometer moved with reference thereto, the relative movement only being required.

In Figure 7 a modified embodiment of the invention has been illustrated which differs only slightly from that already detailed, and those parts which are the same in construction have been supplied with the same reference characters.

In this altered construction the graduated wet-bulb thermometer 17 is located at the right-hand side of the main window, the ungraduated dry-bulb thermometer 16 is positioned at the left-hand side of the window, and the chart 31 and associated relative-humidity scale 32 are somewhat changed.

In this case, as illustrated in Figure 9, the equally-spaced horizontal lines of the chart represent dry-bulb temperatures and the evenly-spaced vertical lines, as in the previous instance, represent relative humidities, while the inclined, oblique or curved lines correspond to wet-bulb temperatures.

As in the other case, since the horizontal and vertical lines are not necessary to the use of the chart, and since the relative-humidity scale must be offset, the chart as determined in the manner indicated in Figure 9 is modified for actual use, as portrayed in Figure 8, and this is mounted on the revoluble cylinder so that it may be turned by the hand of the operator as in the other case.

In using this hygrometer, the operator reads the temperature indicated by the wet-bulb thermometer and then turns the cylinder to register the chart line of such temperature with the top of the liquid column in the bore of the dry-bulb thermometer, whereupon the reading on the scale 32 by the associated index 15 will be the correct relative humidity.

Clearly, under these circumstances, the wet-bulb thermometer need not necessarily form an actual part of this novel and improved instrument, but may be separate therefrom and at a reasonable distance away.

As in the previous case, it is the relative movement between the chart and the dry-bulb thermometer which permits the proper functioning of the device, and this may be accomplished in ways other than those specifically illustrated and described.

Although it has been suggested hereinbefore that it is ordinarily feasible and desirable to omit the graduations on one thermometer in each instance, it will be perfectly apparent that such may be included in the appliance if preferred.

In some cases it may be desirable to supply the chart with designated areas, such as those characterized 33 and 34, to indicate comfortable temperature ranges for summer and winter and these, of course, are so related to the associated scale that the corresponding relative-humidities are easily ascertained.

Those acquainted with this art will readily understand that various modifications of the structures illustrated and described may be made without departure from the substance and principles of the invention as defined by the appended claims.

I claim:

1. In a hygrometer, the combination of a hollow casing open at its top, a wet-bulb thermometer mounted on the outer side of said casing and having a bulb-wick, a water-reservoir cylinder fitted in and revoluble in said casing, closed at its upper end, open at its lower end, and terminating above the floor of said casing, thereby providing a water-well into which said wick extends and the water of which is automatically replenished from said cylinder, said cylinder being removable through the open upper end of said casing to permit it to be filled with water and replaced in the casing, and a chart on and revoluble with said cylinder and coacting with the liquid in said thermometer, said casing having a window above said water-well through which said chart is visible.

2. In a hygrometer of the dry and wet bulb class, the combination of a first thermometer of the dry or wet bulb type, a member displaying a temperature-graduated chart of the other bulb type thermometer and based on a rectilinear system of coordinates with the abscissas representing relative-humidities and with the ordinates representing the temperatures of said first thermometer, said temperature-ordinates being in alignment with the positions of the end of the liquid column of said first thermometer corresponding to said temperatures, a scale of relative-humidities, an index cooperating with said relative-humidities' scale, said thermometer and said temperature-chart being relatively-movable to register the graduations of the chart with the end of the liquid-column of said thermometer, means to move said scale and its index relatively to one another coincidentally with and proportionally to the relative movement of said thermometer and chart to give a reading of relative-humidity by said index on said scale corresponding to the temperature reading on said chart by the end of the thermometer liquid.

3. The structure presented in claim 2 in which said scale is fixed relatively to said chart.

4. The structure presented in claim 2 in which said thermometer is fixed and said chart and scale are fixed with relation to one another and are rotatable as a unit to secure said registration and scale indication.

5. The structure presented in claim 2 in which said index is offset with relation to said thermometer and in which the scale is correspondingly offset with relation to said chart.

6. The structure presented in claim 2 in which said thermometer is fixed and said chart and scale are fixed with relation to one another and are rotatable as a unit to secure said registration and scale indication and in which said index is offset with relation to said thermometer and in which said scale is correspondingly offset with relation to said chart.

7. The structure set forth in claim 2 in which the thermometer is a wet-bulb thermometer and in which the wet-bulb thermometer temperatures of the chart correspond to the wet-bulb subject to air at ordinary room velocity.

ROBERT A. WITTMANN.